ing
3,100,232
PREPARATION OF 2-PHENYL-ALLYL CHLORIDE
Willis C. Keith, Lansing, and Robert P. Zmitrovis, Park
 Forest, Ill., assignors to Sinclair Research, Inc., Wil-
 mington, Del., a corporation of Delaware
No Drawing. Filed Oct. 16, 1961, Ser. No. 145,506
4 Claims. (Cl. 260—650)

This invention is a method for the liquid phase chlorination of an α-methyl styrene to produce 2-phenyl-allyl chloride in good yields. The 2-phenyl-allyl chloride is a valuable intermediate for the preparation of synthetic resins and oil additives and may easily be converted to the corresponding alcohol, ester, and numerous other derivatives. For example, it can be converted to 1-cyano-2-phenyl-1-propene by treatment with sodium cyanide. The 1,2,3-tricloro-2-phenyl propane also produced from α-methyl-styrene in this invention is useful as a solvent and for treating fabrics to make them water and fire resistant. The invention comprises reacting in the liquid phase α-methyl styrene with a less than molar equivalent amount of chlorine. The recovery of the 2-phenyl-allyl chloride may include treatment of the reaction product with hot water and distillation.

Although a chlorination reaction has been described by Tiffeneau in vol. 8, Ann. Chim., No. 10, pp. 166–180 (1907), which includes the addition of chlorine gas to a carbon tetrachloride solution of α-methyl-styrene or contact of the hydrocarbon with chlorine water, this procedure does not limit the chlorine reactant and fails to produce 2-phenyl-allyl chloride, producing only 1,2-dichloro-2-phenyl propane and the chlorohydrin.

The feed to the process of this invention is a substituted or unsubstituted α-methyl-styrene which is of the formula

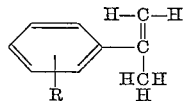

where R is preferably hydrogen but may also be an innocuous substituent such as alkyl of 1–5 carbon atoms, phenyl, halide of 9 to 53 atomic number, etc. The feed advantageously is a hydrocarbon and generally is a liquid at the reaction conditions, but a number of inert solvents such as benzene, n-pentane and $CCl_4$ may be used if desired. Preferably, no solvent is used.

The feedstock is contacted with chlorine to supply about 0.1 to 0.8 mole of chlorine for each mole of α-methyl-styrene feedstock, preferably about 0.2 to 0.65 mole of chlorine per mole of hydrocarbon feed. The contact is performed at a temperature in the range of about −50 to +75° C., preferably at about 0° to 50° C., and atmospheric or other pressure may be used. Under most of these conditions, the α-methyl styrene is a liquid, but below the melting point of this hydrocarbon (−23° C.) a solvent such as normal pentane or other hydrocarbon liquid may be used in an amount sufficient to insure the liquid phase. Above 75° C. dimerization of the α-methyl styrene occurs, seriously affecting the yield. No catalyst is required and preferably the reaction is performed in the substantial absence of catalytic material. The chlorine is preferably in the gaseous $Cl_2$ state when fed to the reaction mixture and also, preferably, it will be diluted with an inert gas, such as nitrogen, to avoid any localized concentration of chlorine.

The chlorination product formed by low temperature liquid phase chlorination can be treated at elevated temperature to decompose the unstable chlorides and recover the allyl chloride. However, treatment with hot water is by far the most desirable procedure. The water is preferably substantially free of contaminants and is supplied in the amount of at least about 0.5 to about 50 or more, preferably about 4 to 10 volumes of water per volume of chlorination reaction product. Excess water does not prevent the desired treatment but its addition may be uneconomical. A temperature of about 25 to 150° C., preferably about 75 to 125° C., is usually employed and the contacting generally will use a pressure sufficient to maintain the liquid phase, although steam in a vapor phase treatment may also be employed. The contact of water and the chlorination product usually lasts from about 0.05 to 5 hours; preferably about 0.25 to 1 hour is sufficient. The hot water treatment converts thermally unstable chlorides produced in the reaction, which could interfere with a distillation procedure for 2-phenyl-allyl chloride isolation, into α-methyl-styrene which in turn can be recycled to the chlorination; 1-chloro-2-phenyl-propane-1, which can be used for the preparation of insecticides and other useful products; and 1-chloro-2-hydroxy-2-phenyl-propane which is easily converted to α-methyl-styrene-oxide as well as other valuable intermediates. The 2-phenyl-allyl chloride may then be obtained from the water-treated product by distillation.

The following examples are to be considered illustrative and not limiting.

*Example I*

A fluted flask equipped with a thermowell, condenser, stirrer and gas dispersion tube, placed in a constant temperature bath at 25° C. was used for the chlorination reaction. The flask was charged with 489 grams of α-methyl-styrene and molecular chlorine gas, diluted with a small amount of nitrogen, was introduced at a rate of 0.5 mole of chlorine/mole of α-methyl-styrene/hour. After a total of 156 grams (0.54 mole/mole hydrocarbon) of chlorine was added, the reaction mixture was allowed to stir for one hour. The reaction product was added to a stirred flask containing 3000 grams of water at 100° C., which was 6.1 volumes water per volume of chlorination product. The mixture was contacted for 0.5 hour, and the phases separated. The oil phase was dried with calcium sulfate and distilled through a glass-helices-packed column at a reduced pressure of about 10 mm. Hg absolute. It was found that 51.5% of the α-methyl-styrene was converted to reaction products. The yield of products based on feed consumed was as follows:

| Products | Moles/100 moles feed | Gms./100 gms. feed |
|---|---|---|
| 2-phenyl-allyl chloride | 49 | 66.3 |
| 1-chloro-2-hydroxy-2-phenyl propane | 24 | 33.4 |
| 1-chloro-2-phenyl-1-propene | 18 | 23.7 |
| 1,2,3-trichloro-2-phenyl propane | 9 | 11.6 |

The trichloro phenyl propane contained a small amount of polymer. The high yield of useful products obtained by the process of this invention is apparent.

*Example II*

In another run, 227.5 g. of α-methyl styrene was reacted with 72.5 gms. (0.54 mole) chlorine gas for two hours at about −20° C. The resulting 300 gms. of product were treated with 1000 gms. of water for one hour at about 100° C. The process resulted in a conversion of 52.5% of the hydrocarbon feed and a yield of 73 gms. 2-phenyl allyl chloride.

*Example III*

In this run 754.5 gms. of α-methyl styrene were reacted with 125.5 moles chlorine gas, a molar ratio of about 0.28, using a temperature of 25° C. and about 50 mole percent nitrogen as a diluent for the chlorine. After this reaction, the product was treated with 3000 g. water at 100° C. for half an hour. Subsequent disillation gave 108 grams of 2-phenyl allyl chloride.

We claim:
1. The method which comprises reacting alpha-methyl-styrene with about 0.1 to 0.8 mole of chlorine per mole of alpha-methyl-styrene in the liquid phase at a temperature of about —50 to 75° C. to obtain a reaction product containing 2-phenyl-allyl-chloride.
2. The method of claim 1 in which about 0.2 to 0.65 mole of chlorine gas are supplied per mole of alpha-methyl-styrene and the temperature is about 0 to 50° C.
3. The method which comprises reacting alpha-methyl-styrene with about 0.1 to 0.8 mole of chlorine per mole of alpha-methyl-styrene in the liquid phase at a temperature of about —50 to 75° C., and contacting the chlorinated product with at least about 0.5 volume of water per volume of chlorinated product at a temperature of about 25 to 150° C. to obtain 2-phenyl-allyl-chloride.
4. The method of claim 4 in which the water treatment is at about 75 to 125° C. and about 4 to 10 volumes of water per volume of chlorinated product are used.

References Cited in the file of this patent

Tiffeneou: "Annales de Chimie et de Phisique," 8, No. 10 (1907), p. 166.

Hatch et al.: "Jour. Am. Chem. Soc.," vol. 76 (1954), pp. 2705–7.